UNITED STATES PATENT OFFICE.

DIBRELL P. HYNES, OF CHICAGO, ILLINOIS, ASSIGNOR TO ROSEBERRY SURPRISE MINING CO. LTD., OF SANDON, BRITISH COLUMBIA, CANADA, A CORPORATION OF BRITISH COLUMBIA, CANADA.

PROCESS OF FILTRATION.

1,373,887.     Specification of Letters Patent.     Patented Apr. 5, 1921.

No Drawing.     Application filed January 26, 1920. Serial No. 354,300.

*To all whom it may concern:*

Be it known that I, DIBRELL P. HYNES, a citizen of the United States, residing at Chicago, in the county of Cook and State of Illinois, have invented a certain new and useful Improvement in Processes of Filtration, of which the following is a specification.

My invention relates to a process for filtering a mixture of solids, colloidal material, and liquid, wherein a reagent is added to the mixture or pulp, which acts on the colloidal substances, and reduces or prevents impairment by them of the filterability of the mixture.

The use of the addition of the reagent for this purpose, is not limited to the treatment of any specific substance, and may be used in the separation or filtration of any substances, metallic, and non-metallic in the filtration of which colloidal substances interfere. I illustrate the process by its application to the separation of zinc solutions from solid ore residues.

My process as so applied, is an improvement of the zinc leaching process, well known in the art, wherein the oxidized or roasted zinc ore is placed in a solution of acid, and the zinc is dissolved in the solution, leaving a residue of solid substances, v hich may or may not contain other materials. When the dissolution of the zinc is completed, and the solution is substantially free from acid, the below described reagent is added thereto, to granulate and coagulate the colloidal material in the mixture, which otherwise remains in a pasty condition and impedes or inhibits filtration.

It is generally found preferable to heat the pulp before the addition of the reagent, and to follow the addition of the reagent by a period of agitation of the completed mixture previous to filtration.

In my improved process I add to the pulp which I desire to filter, a small quantity of a basic zinc compound, for example an emulsion of zinc oxid or a solution of zinc oxid or zinc salts or zinc hydroxid, all of which have a similar effect on the colloidal substances. The quantity of the zinc compound may vary according to the percentage of colloidal substances in the pulp. In applying my process to the separation of a zinc solution from a solid residue approximately ½ of 1 per cent. of the weight of the dried ore serves to treat the colloidal substances.

It will be understood that I do not limit myself to the application of my process to a solution containing any specific metallic or non-metallic substances, as my process is susceptible of use with a wide range of substances. The description of its application to zinc separation is given as illustrative of its general application.

I claim:

1. The process of preparing for filtration a pulp containing solid and colloidal substances, which consists in adding to a pulp substantially free from acid, a basic compound of zinc, to change the colloidal substances to a form which does not inhibit filtration.

2. The process of preparing for separation a pulp containing solid and colloidal substances which consists in adding to a pulp substantially free from acid, a basic compound of zinc, to change the colloidal substances to a form which does not inhibit separation.

3. The process of filtering a pulp containing solid and colloidal substances and substantially free from acid, which consists in heating the pulp and adding thereto a basic compound of zinc, to change the colloidal substances to a form which does not inhibit filtration, agitating the completed mixture, and filtering it by any suitable means.

4. The process of separating a pulp containing solid and colloidal substances, which consists in neutralizing the pulp, heating it, and adding thereto a basic compound of zinc to change the colloidal substances to a form which does not inhibit filtration, agitating the completed mixture, and separating it by any suitable means.

5. The process of preparing for filtration a pulp containing solid and colloidal substances and substantially free from acid, which consists in adding to the pulp a small quantity of zinc oxid, to change the colloidal substances to a form which does not inhibit filtration.

6. The process of preparing for separation a pulp containing solid and colloidal substances and substantially free from acid, which consists in adding to the pulp already made neutral, a small quantity of zinc oxid to change the colloidal substances to a form which does not inhibit separation.

Signed at Chicago county of Cook and State of Illinois, this 23rd day of January, 1920.

DIBRELL P. HYNES.